United States Patent [19]
Ferrar et al.

[11] Patent Number: 5,464,703
[45] Date of Patent: Nov. 7, 1995

[54] TIN OXIDE FILLED DIMETHYLSILOXANE-FLUOROALKYLSILOXANE FUSER ROLL FOR FIXING TONER TO A SUBSTRATE

[75] Inventors: Wayne T. Ferrar, Fairport; William B. Vreeland, Webster; Charles E. Hewitt, Rochester; John J. Fitzgerald, Webster; Tonya D. Binga, Rochester, all of N.Y.

[73] Assignee: Eastman Kodak Company, Rochester, N.Y.

[21] Appl. No.: 268,131

[22] Filed: Jun. 29, 1994

[51] Int. Cl.$^6$ .................................... B32B 27/00
[52] U.S. Cl. ................ 428/421; 428/358; 428/330; 428/411.1; 428/447; 428/457; 428/906; 355/284; 219/216; 430/98; 430/99; 430/124; 492/53; 492/54; 492/56
[58] Field of Search .................. 430/99, 124, 98; 428/35.8, 36.9, 447, 35.8, 330, 411.1, 421, 447, 457, 906; 492/56, 53, 54, 56; 355/284; 219/216

[56] References Cited

U.S. PATENT DOCUMENTS

| | | | |
|---|---|---|---|
| 4,264,181 | 4/1981 | Lentz et al. | 355/3 |
| 4,272,179 | 6/1981 | Seanor | 355/3 |
| 4,373,239 | 2/1983 | Henry et al. | 29/132 |
| 4,375,505 | 3/1983 | Newkirk | 430/99 |
| 4,430,406 | 2/1984 | Newkirk et al. | 430/99 |
| 4,501,482 | 2/1985 | Stryjewski | 355/3 |
| 4,515,884 | 5/1985 | Field et al. | 430/99 |
| 4,518,655 | 5/1985 | Henry et al. | 428/329 |
| 4,853,737 | 8/1989 | Hartley et al. | 355/289 |
| 4,970,098 | 11/1990 | Ayala-Esquilin et al. | 428/36.6 |
| 5,017,432 | 5/1991 | Eddy et al. | 428/122 |
| 5,269,740 | 12/1993 | Fitzgerald et al. | 492/56 |
| 5,292,562 | 3/1994 | Fitzgerald et al. | 428/396 |
| 5,292,606 | 3/1994 | Fitzgerald | 428/396 |

OTHER PUBLICATIONS

J. J. Fitzgerald et al., "The Effect of Cyclic Stress on the Physical Properties of a Poly(Dimethylsiloxane) Elastomer," *Polymer Engineering and Science*, Sep. 1992, vol. 32, No. 18, pp. 1350–1357.

*Primary Examiner*—Patrick J. Ryan
*Assistant Examiner*—William A. Krynski
*Attorney, Agent, or Firm*—Anne B. Kiernan; Robert Luke Walker

[57] ABSTRACT

A fuser member useful for heat-fixing an electrographic toner to a substrate, a composition of matter and a preparation method. The fuser member has a core and a base cushion layer overlying the core. The base cushion layer includes a crosslinked poly(dimethylsiloxane-fluoroalkylsiloxane) elastomer that has tin oxide particles dispersed therein in a concentration of from 20 to 40 percent of the total volume of the base cushion layer.

20 Claims, 4 Drawing Sheets

TIN OXIDE FILLED DIMETHYLSILOXANE-FLUOROALKYLSILOXANE FUSER ROLL FOR FIXING TONER TO A SUBSTRATE

FIELD OF THE INVENTION

This invention relates to a fuser member useful for heat-fixing a heat-softenable toner material to a substrate. More particularly, the invention relates to a metal oxide filled poly(dimethylsiloxanefluoroalkylsiloxane) fuser member having improved stability under conditions of elevated temperature and cyclic stress.

BACKGROUND OF THE INVENTION

Heat-softenable toners are widely used in imaging methods such as electrostatography, wherein electrically charged toner is deposited imagewise on a dielectric or photoconductive element bearing an electrostatic latent image. Most often in such methods, the toner is then transferred to a surface of another substrate, such as, e.g., a receiver sheet comprising paper or a transparent film, where it is then fixed in place to yield the final desired toner image.

When heat-softenable toners, comprising, e.g., thermoplastic polymeric binders, are employed, the usual method of fixing the toner in place involves applying heat to the toner once it is on the receiver sheet surface to soften it and then allowing or causing the toner to cool.

One such well-known fusing method comprises passing the toner-bearing receiver sheet through the nip formed by a pair of opposing rolls, at least one of which (usually referred to as a fuser roll) is heated and contacts the toner-bearing surface of the receiver sheet in order to heat and soften the toner. The other roll (usually referred to as a pressure roll) serves to press the receiver sheet into contact with the fuser roll. In some other fusing methods, the configuration is varied and the "fuser roll" or "pressure roll" takes the form of a flat plate or belt. The description herein, while generally directed to a generally cylindrical fuser roll in combination with a generally cylindrical pressure roll, is not limited to fusing systems having members with those configurations. For that reason, the term "fuser member" is generally used herein in place of "fuser roll" and the term "pressure member" in place of "pressure roll".

The fuser member usually comprises a rigid core covered with a resilient material, which will be referred to herein as a "base cushion layer." The resilient base cushion layer and the amount of pressure exerted by the pressure member serve to establish the area of contact of the fuser member with the toner bearing surface of the receiver sheet as it passes through the nip of the fuser member and pressure members. The size of this area of contact helps to establish the length of time that any given portion of the toner image will be in contact with and heated by the fuser member. The degree of hardness (often referred to as "storage modulus") and stability thereof, of the base cushion layer are important factors in establishing and maintaining the desired area of contact.

In some previous fusing systems, it has been advantageous to vary the pressure exerted by the pressure member against the receiver sheet and fuser member. This variation in pressure can be provided, for example in a fusing system having a pressure roll and a fuser roll, by slightly modifying the shape of the pressure roll. The variance of pressure, in the form of a gradient of pressure that changes along the direction through the nip that is parallel to the axes of the rolls, can be established, for example, by continuously varying the overall diameter of the pressure roll along the direction of its axis such that the diameter is smallest at the midpoint of the axis and largest at the ends of the axis, in order to give the pressure roll a sort of "bow tie" or "hourglass" shape. This will cause the pair of rolls to exert more pressure on the receiver sheet in the nip in the areas near the ends of the rolls than in the area about the midpoint of the rolls. This gradient of pressure helps to prevent wrinkles and cockle in the receiver sheet as it passes through the nip. Over time, however, the fuser roll begins to permanently deform to conform to the shape of the pressure roll and the gradient of pressure is reduced or lost, along with its attendant benefits. It has been found that permanent deformation (alternatively referred to as "creep") of the base cushion layer of the fuser member is the greatest contributor to this problem.

One type of material that has been widely employed in the past to form a resilient base cushion layer for fuser rolls is condensation-crosslinked poly(dimethylsiloxane) elastomer. "Poly (dimethylsiloxane)" will sometimes be alternatively referred to herein as "PDMS". The prior art has also taught or suggested that various fillers comprising inorganic particulate materials can be included in such PDMS base cushion layers to improve their mechanical strength and/or thermal conductivity. Higher thermal conductivity is advantageous when the fuser roll is heated by an internal heater, so that the heat can be efficiently and quickly transmitted toward the outer surface of the fuser roll and toward the toner on the receiver sheet it is intended to contact and fuse. Higher thermal conductivity is not so important when the roll is intended to be heated by an external heat source. Disclosure of such filled condensation-cured PDMS elastomers for fuser rolls can be found, for example, in U.S. Pat. Nos. 4,373,239; 4,430,406; and 4,518,655.

Optimal metal-filled elastomer fuser members have long been sought. At one time, it was predicted that:

"The metal of the metal-containing filler dispersed in the elastomer may be easily selected by one skilled in the art without undue experimentation by testing the metal-containing filler, such as a metal, metal alloy, metal oxide, metal salt or other metal compound, in an elastomer. The general classes of metals which are applicable to the present invention include those metals of Groups 1b, 2a, 2b, 3a, 3b, 4a, 4b, 5a, 5b, 6b, 7b, 8 and the rare earth elements of the Periodic Table." (U.S. Pat. No. 4,264,181 to Lentz et al, column 10, lines 42–53; also U.S. Pat. No. 4,272,179 to Seanor, column 10, lines 45–54.)

This prediction of easy selection of the metal for a metal-containing filler has proven false in the face of latter efforts in the art.

A metal-containing filler which provides good results in one elastomer may provide very poor results in another elastomer, even if the elastomers are very similar. In U.S. Pat. No. 4,264,181 to Lentz et al, good results were obtained when lead oxide was used as a filler in various fluoroelastomers (Viton E430, Viton E60C, Viton GH; Examples X, XI, XII). In U.S. Pat. No. 5,017,432 to Eddy et al, on the other hand, the use of lead oxide in similar fluoroelastomers (for example, Viton GF) is taught against on the basis that it would produce an unacceptable fuser member. In these fluoroelastomers, cupric oxide is preferred. Similarly, U.S. Pat. No. 4,515,884 to Field et al, discloses a fuser member which utilizes metal oxide filled polydimethylsiloxane. The metal oxides are iron oxide and tabular alumina. Calcined alumina is described as being unsuitable per se. (Column 9, line 50–Column 10, line 47.)

An additional difficulty that has faced those attempting to produce metal-filled elastomer fuser members has recently been identified. In the past, it was thought that various materials' suitability for use in fuser roll base cushion layers in terms of their stability during use—i.e., their ability to resist degradation (as evidenced by weight loss), creep, and changes in hardness, during use in fuser rolls—could be determined by subjecting samples of the materials to conditions of continuous high temperature and continuous high stress (i.e., pressure), and then measuring the resultant changes in weight, shape (e.g., length), and hardness (e.g., storage modulus). However, J.J. Fitzgerald et al, "The Effect of Cyclic Stress on the Physical Properties of a Poly(Dimethylsiloxane) Elastomer", *Polymer Engineering and Science*, Vol. 32, No. 18, (Sept 1992), pp. 1350–1357; indicates that such testing does not accurately portray the stability the materials will exhibit during actual use in fuser roll base cushion layers and that dynamic testing, with cycles of loading and unloading is necessary. The publication cites other reports showing the same kind of results in studies of other elastomers. Accordingly, a device called a Mechanical Energy Resolver (sometimes alternatively referred to herein as an "MER") has been developed, which can be used to test samples of materials of interest for use in fuser roll base cushion layers. The device applies heat continuously to maintain the samples at a constant elevated temperature. The device also applies stress to the samples in the form of a compressive force, but does so in a manner such that the amount of compressive force applied varies cyclicly (i.e., sinusoidally). The results of such testing consistently correlate with, and therefore reliably predict, the degree of stability a material will exhibit in the base cushion layer of a fuser roll during actual use.

The realization of the need for dynamic testing has promised more accurate evaluation of filled elastomers, however, preparation of metal containing elastomers remains problematic. U.S. Pat. Nos. 4,515,884 to Field et al, and 5,017,432 to Eddy et al, cite large numbers of critical features or important aspects of their metal containing elastomers: choice of material (Field, column 9, lines 50–65 and column 10, lines 24–25), interaction of filler surface and elastomer (Field, column 9, lines 32–65), particle size (Field, column 10, lines 1–8 and lines 25–30; Eddy, column 9, line 65–column 10, line 3), concentration of metal-filler (Field, column 10, lines 9–23 and lines 31–47), capability of interacting with functional groups of release agent (Eddy, column 9, lines 26–30), reactivity of the metal filler with the elastomer (Eddy, column 9, lines 33–43), and acid-base characteristics of the metal filler (Eddy, column 9, lines 43–56). The lists of critical features and important aspects in Field and Eddy do not fully correlate. It is unknown whether this difference represents real differences in material characteristics or only differences in techniques and analysis.

One specific example of a condensation-crosslinked PDMS elastomer, which contains about 32–37 volume percent aluminum oxide filler and about 2–6 volume percent iron oxide filler, and which has been widely used and taught to be useful in fuser rolls, is sold under the trade name, EC4952, by the Emerson Cummings Co., U.S.A. However, it has been found that fuser rolls containing EC4952 cushion layers exhibit serious stability problems over time of use, i.e., significant degradation, creep, and changes in hardness, that greatly reduce their useful life. The present inventors have also found that MER test results correlate with and thus accurately predict the instability exhibited during actual use. Nevertheless, materials such as EC4952 initially provide very suitable resilience, hardness, and thermal conductivity for fuser roll cushion layers.

Some filled condensation-crosslinked PDMS elastomers are disclosed in U.S. Pat. No. 5,269,740 (copper oxide filler), U.S. Pat. No. 5,292,606 (zinc oxide filler), U.S. Pat. No. 5,292,562 (chromium oxide filler), U.S. patent application Ser. No. 08/167,584 (tin oxide filler), U.S. patent application Ser. No. 08/159,013 (nickel oxide filler). These materials all show much less change in hardness and creep than EC4952 or the PDMS elastomer with aluminum oxide filler. U.S. Pat. No. 5,292,606 and U.S. patent application Ser. No. 08/167,584 disclose that tin oxide filler and zinc oxide filler can provide very good results in PDMS.

PDMS elastomers have a particular shortcoming in use. In order to improve release of toner from the fuser roller during fusing, polydimethylsiloxane fluid, referred to as fusing oil, is commonly applied to the fusing roller during use. This can improve release characteristics, but has been found to cause swelling of filled PDMS elastomer base cushions. Unfortunately, the amount of polydimethylsiloxane fluid absorbed by the base cushion inside and outside the paper path tends to differ, resulting in differential swelling and fusing problems. Alternative fusing oils can be used to reduce swelling; however, those fusing oils are much more expensive.

U.S. Pat. No. 4,970,098 to Ayala-Esquillin et al teaches a condensation cross-linked diphenylsiloxane-dimethylsiloxane elastomer having 40 to 55 weight percent zinc oxide, 5 to 10 weight percent graphite, and 1 to 5 weight percent ceric dioxide.

It would therefore be very desirable to be able to provide a fuser member with a base cushion layer comprising a condensation-crosslinked elastomer containing appropriate fillers, wherein the cushion layer material will exhibit, under conditions of elevated temperature and cyclic stress, good resistance to degradative weight loss, creep, changes in hardness, and swelling. The present invention meets this need.

SUMMARY OF THE INVENTION

The invention provides a fuser member useful for heat-fixing an electrographic toner to a substrate, a composition of matter and a preparation method. The fuser member has a core and a base cushion layer overlying the core. The base cushion layer includes a crosslinked poly(dimethylsiloxane-fluoroalkylsiloxane) elastomer that has tin oxide particles dispersed therein in a concentration of from 20 to 40 percent of the total volume of the base cushion layer.

The base cushion layer of the fuser member of the invention has been unexpectedly found to exhibit only minimal weight loss, creep, changes in hardness, and swelling; when subjected to prolonged conditions of elevated temperature and cyclic stress.

BRIEF DESCRIPTION OF THE FIGURES

The above-mentioned and other features and objects of this invention and the manner of attaining them will become more apparent and the invention itself will be better understood by reference to the following description of an embodiment of the invention taken in conjunction with the accompanying figures wherein.

DESCRIPTION OF PARTICULAR EMBODIMENTS

Figure 1A:
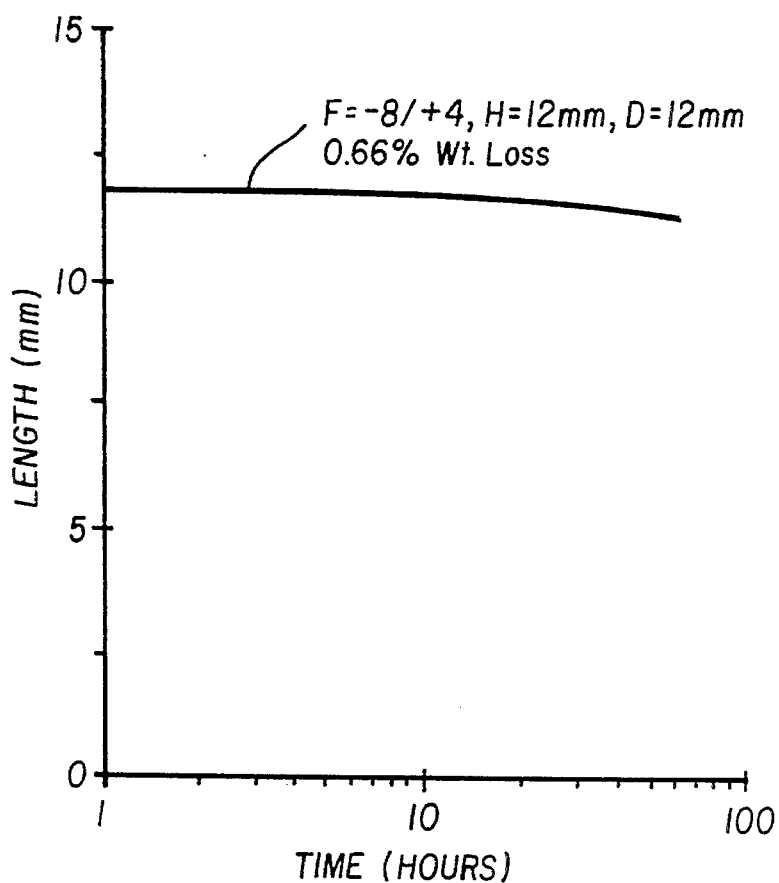
FIG. 1a is a graph of fractional length vs. time for the material of Example 1.

The metal oxide filled elastomer in the base cushion layer of the fuser member of the invention includes the cured polymer of the invention: a polymer produced by condensation crosslinking poly(dimethylsiloxane-fluoroalkylsiloxane) ( poly(DMS-FAS)) having the general structure:

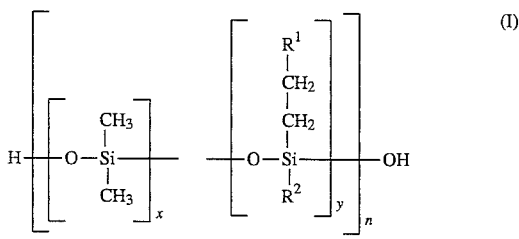

$R^1$ is fluoroalkyl having from about 1 to 18 carbons and from about 3 to 37 fluorine atoms. $R^2$ is alkyl having from 1 to 6 carbons. It is currently preferred that $R^1$ have the general structure:

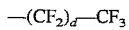

—$(CF_2)_d$—$CF_3$ where d is from 3 to 5. It is currently more preferred that d is 5. It is currently preferred that $R^2$ is methyl.

The value of n can be varied widely depending upon an intended use of the crosslinked polymer. For the purposes of a fuser member of the invention, n is an integer such that the Structure (I) polymer, prior to crosslinking, has a number average molecular weight of from about $1 \times 10^3$ to $1 \times 10^6$. If the molecular weight were below about $1 \times 10^3$, the final crosslinked poly(DMS-FAS) would have a high crosslink density that would make the material too hard and brittle, and not resilient enough to serve practically in a base cushion layer. If the molecular weight were above about $1 \times 10^6$, the final crosslinked poly(DMS-FAS) would be too unstable under conditions of high temperature and cyclic stress (i.e., there would be too much creep and change in hardness over time), even when filled in accordance with the invention.

The values of x and y are the number of equivalents of dimethyl and fluorosiloxane units, respectively. The ratio x/y can be varied from about 99:1 to 70:30. It is currently preferred that the ratio x/y be from about 98:2 to 80:20 and more preferred that the ration be from about 94:6 to 87:13.

The poly(DMS-FAS) shown in Structure I is itself a condensation product. The poly(DMS-FAS) is produced by condensation crosslinking difunctional silanol terminated dimethylsiloxane oligomer or polymer and difunctional fluoroalkylsilane.

The difunctional silanol terminated dimethylsiloxane oligomer or polymer has the general structure:

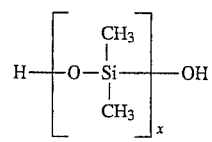

The value of x (which determines the number of linked dimethylsiloxane units in Structure I) can be varied over a wide molecular range. Generally useful blocks of poly(dimethylsiloxane) are from 400 to 18,000 molecular weight. Lower molecular weight segments of x units allow for a higher incorporation of the fluorosilane component for a given molecular weight of Structure I. Silanol-terminated dimethylsiloxane oligomers and polymers and methods of their preparation are well known. They are readily commercially available, e.g., from United Chemical (formerly Huls America, Inc.) of Piscataway, N.J.

The fluoroalkylsilane has the general structure:

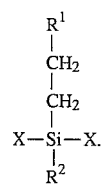

The values of $R^1$ and $R^2$ were discussed above. X represents an end group that is functional to condense with the hydroxy end groups of the dimethylsiloxane to thereby create siloxane crosslinks through the silicon atom of the silane. The functional groups of the fluoroalkylsilane can be, for example, chloro, acyloxy (R—COO—), alkenoxy ($CH_2$=C(R)O—), alkoxy (R—O—), dialkylamino ($R_2$N—), or alkyliminoxy ($R_2$C=N—O—) groups, wherein R represents an alkyl moiety. In a currently preferred embodiment of the invention X is chloro. A specific example of a suitable difunctional fluoroalkylsilane is tridecafluoro-1,1,2,2-tetrahydroocytyl-1-methyldichlorosilane. This material is available from United Chemical of Piscataway, N.J.

It is currently preferred that the poly(DMS-FAS) polymer have only dimethyl and fluoroalkylsiloxane subunits; however, the poly(DMS-FAS) polymer can have a small percentage of other subunits, as long as physical characteristics of the resulting fuser member remain substantially unchanged. For example, some dimethyl subunits could be replaced by other dialkyl, such as diethyl. Similarly, a small amount of difunctional non-fluorinated alkylsilane could be added. The addition of more than a negligible amount of polyfunctional dimethylsiloxane or polyfunctional silane is undesirable, since the resulting poly(DMS-FAS) would form a relatively highly crosslinked network. Linear or substantially linear poly(DM-FAS) is highly preferred.

The poly(DMS-FAS) polymer is cured by condensation-crosslinking with polyfunctional silane to produce the cured polymer of the invention. The polyfunctional silane has at least two groups, and preferably more than two groups, that are functional to condense with the hydroxy end groups of the Structure (I) polymers to thereby create siloxane crosslinks through the silicon atom of the silane. Examples of suitable functional groups for the polyfunctional silanes are the same as those discussed above in relation to the difunctional fluoroalkylsilanes: for example, chloro, acyloxy (R—COO—), alkenoxy ($CH_2$=C(R)O—), alkoxy (R—O—), dialkylamino ($R_2$N—), or alkyliminoxy ($R_2C=N-O-$) groups, wherein R represents an alkyl moiety. Specific examples of suitable polyfunctional silanes include: methyltrimethoxysilane, tetraethoxysilane, methyltripropenoxysilane, methyltriacetoxysilane, methyltris(butanone oxime)silane, and methyltris(diethylamino)silane.

In di- or poly-functional silanes having alkoxy functional groups, the condensation crosslinking reaction is carried out with the aid of a catalyst, such as, for example, a titanate, chloride, oxide, or carboxylic acid salt of zinc, tin, iron, or lead. Some specific examples of suitable catalysts are zinc octoate, dibutyltin diacetate, ferric chloride, and lead dioxide.

A composition of matter of the invention includes the cured polymer and metal oxide particles. In a non-critical use, for example as a general purpose seal or as a bumper or cushion on a small article, the selection of the metal oxide is not critical, as long as the oxide does not interfere with the condensation reaction. The percentage of metal oxide can be varied widely as long as roughly acceptable mechanical properties are maintained, for example, a bumper can has a broad range of acceptable hardnesses, but it should not readily break into pieces or flow out of position.

The cured polymers and metal oxide filled cured polymers of the invention are prepared, as indicated in the above explanation, by two separate condensation crosslinking steps. In the first, dimethylsiloxane is condensed with difunctional fluoroalkylsilane to produce a linear or substantially linear product. Suitable reaction conditions, catalysts and the like are well known to those skilled in the art. The resulting poly(DMS-FAS) is purified to hydrolyze any unreacted chlorosilane and remove unreacted starting materials and other contaminants, by techniques well known to those skilled in the art. The poly(DMS-FAS) is then mixed with filler, if any, and polyfunctional silane and cured under suitable conditions also well known to those skilled in the art.

For the purposes of the base cushion layer of the fuser member of the invention, it desirable to provide a cured polymer of the invention that is resistant to deformation and hardening under is highly cylic stress. In a currently preferred embodiment of the invention, tin oxide particles comprise from 20 to 40 percent of the total volume of the base cushion layer. Concentrations less than 20 volume percent may not provide the degree of stability desired to the layer. Concentrations greater than 40 volume percent will render the layer too hard to provide the desired area of contact with the toner-bearing receiver sheet.

The tin oxide particles can be obtained from any convenient commercial source, e.g., Magnesium Electron, Inc. of Flemington, N.J. The particle size does not appear to be critical. Particle sizes anywhere in the range of 0.1 to 100 micrometers have been found to be acceptable. In the examples presented below the tin oxide particles were from 1 to 40 micrometers in diameter.

The tin oxide filler particles are mixed with the Structure (I) polymer and polyfunctional silane prior to curing the mix on a fuser member core to form the base cushion layer.

In cases where it is intended that the fuser member be heated by an internal heater, it is desirable that the base cushion layer have a relatively high thermal conductivity, so that the heat can be efficiently and quickly transmitted toward the outer surface of the fuser member that will contact the toner intended to be fused. Tin oxide filler particles increase the thermal conductivity of the condensation-crosslinked poly(DMS-FAS) base cushion layer.

Fuser members in accordance with the invention can also have one or more other layers over the base cushion layer, if desired. This allows one not to be concerned with the wear-resistance and toner-release properties of the base cushion layer. Properties such as abrasion-resistance and the ability to fuse toner without having some of the toner adhere to the fuser member and be pulled away from the receiver sheet as it exits the nip of the rolls, can be provided by such other layer or layers over the base cushion layer, as is well known in the art.

In some fusing systems a release oil, such as a PDMS oil, is continually provided and coated over the outermost surface of the fuser member during use, in order to aid the roll in releasing from the toner it contacts during the fusing operation. The tin filled, condensation-crosslinked poly(DMS-FAS) base cushion layer of the fuser member of the invention is substantially resistant to swelling. If even less swelling is desired, materials for one or more layers over the base cushion layer can be chosen to provide a barrier that prevents release oil from coming into contact with the base cushion layer, as is also well known in the art.

For description of other layers and materials therefor that can be usefully provided over fuser member base cushion layers, see, for example, U.S. Pat. Nos. 4,375,505; 4,430,406; 4,501,482; and 4,853,737. In some specific embodiments of the present invention, the base cushion layer has one other layer thereover, which is an oil-barrier layer comprising poly(vinylidene fluoride-co-hexafluoropropylene), a material commercially available, for example, from DuPont, U.S.A., under the trademark, Viton A. In some other specific embodiments, there are two layers over the base cushion layer, e.g., an oil-barrier layer and, thereover, an outermost layer that provides good wear-resistance and toner-release properties, comprising, for example, a vinyl-addition-crosslinked poly(DMS-FAS) having silica and titania fillers dispersed therein, such as is commercially available from Dow-Corning, U.S.A., under the trademark, Silastic E.

Usually, the other layer or layers, when employed, are flexible but thinner than the base cushion layer, so that the base cushion layer can provide the desired resilience to the fuser member, and the other layers can flex to conform to that resilience without having to be resilient themselves. The thickness of the base cushion layer and other layers will be chosen with consideration of the requirements of the particular application intended. For example, base cushion layer thicknesses in the range from 0.6 to 5.0 mm have been found to be appropriate for various applications. In some embodiments of the present invention, the base cushion layer is about 2.5 mm thick, and any oil-barrier and/or wear-resistant toner-release layers thereover are each about 25 to 30 micrometers thick.

The core of the fuser member is selected to provide a finished article having a desired configuration, such as a roll or plate or belt, and a desired set of physical characteristics. For example, the core of a fuser roll is usually cylindrical in shape. It comprises any rigid metal or plastic substance. Metals are preferred when the fuser member is to be internally heated, because of their generally higher thermal conductivity. Suitable core materials include, e.g., aluminum, steel, various alloys, and polymeric materials such as thermoset resins, with or without fiber reinforcement. The core can be a support which has been conversion coated and primed with metal alkoxide primer in accordance with a U.S. Patent application filed by Allen Kass, Oct. 21, 1993, entitled "FUSING MEMBER FOR ELECTROSTATOGRAPHIC REPRODUCING APPARATUS AND METHOD FOR PREPARING FUSING MEMBER"; the specification of which is hereby incorporated by reference herein.

To form the base cushion layer of a fuser member in accordance with the invention, the Structure (I) polymer, a slight excess of the stoichiometric amount of multifunctional silane to form crosslinks with all the hydroxy end groups of the Structure (I) polymer, and the appropriate amount of tin oxide filler can be thoroughly mixed on a three-roll mill. If a catalyst is necessary, it is then added to the mix with thorough stirring. The mix is then degassed and injected into a mold surrounding the fuser member core to mold the material onto the core. The covered core remains in the mold for a time sufficient for some crosslinking to occur (e.g., 18 hours). The covered roll is then removed from the mold and heated to accelerate the remaining crosslinking. The other layer or layers are then coated thereover by any appropriate method.

The invention is further illustrated by the following Examples and Comparative Examples.

Example 1

Part 1: Preparation of DO1V(6 mole % fluorosiloxane/ 94mole % dimethylsiloxane).

Poly(DMS-FAS) having =94 and y=6 as defined in Structure I was prepared by combining in a 3 liter three necked round bottom flask equipped with a mechanical stirrer, reflux condenser, and argon inlet: tetrahydrofuran (500 mL); silanol terminated poly(dimethylsiloxane) having an average molecular weight of 4200 marketed as PS341 by United Chemical (401 grams, 96 mmol); and triethylamine (13.3mL, 96 mmol). Tridecafluoro-1,1,2,2-tetrahydrooctyl-1-methyldichlorosiloane (22 grams, 48 mmol) marketed as T2491 by United Chemical, was dissolved in tetrahydrofuran (200 mL). The fluorinated dichlorosilane solution was added dropwise to the previously described reaction mixture with stirring over a period of 3 hours. The resulting slightly viscous, white solution was stirred for 72 hours and then the precipitate was allowed to settle before filtering the reaction mixture through a coarse fritted funnel. The clear solution was then washed with water to hydrolyze unreacted chloride and remove salt. That washing was in a separatory funnel, four times, using two liters of water each time. The product was then concentrated by rotary evaporation. The resulting poly(DMS-FAS) (351 grams) had a number average molecular weight of 5670 and a weight average molecular weight of 16,500. Elemental analysis gave actual values of C=32.21, H=7.55, and F=3.41. This compares to theoretical values of C=32, H=7.7, and F=3.4.

Part 2:Cured poly(6 mole % fluorosiloxane/94 mole % dimethylsiloxane) having 30 Vol % tin oxide Sample slabs of cured tin oxide filled poly(DMS-FAS) were prepared by combining the poly(DMS-FAS) product of Part 1 (130.77 grams), tetraethoxysilane (1.57 grams) and particulate tin oxide (417 grams) on a three roll mill and then stirring dibutyltin diacetate catalyst (4.58 grams) into the mix. A slab was then formed and allowed to cure.

Figure 1B:
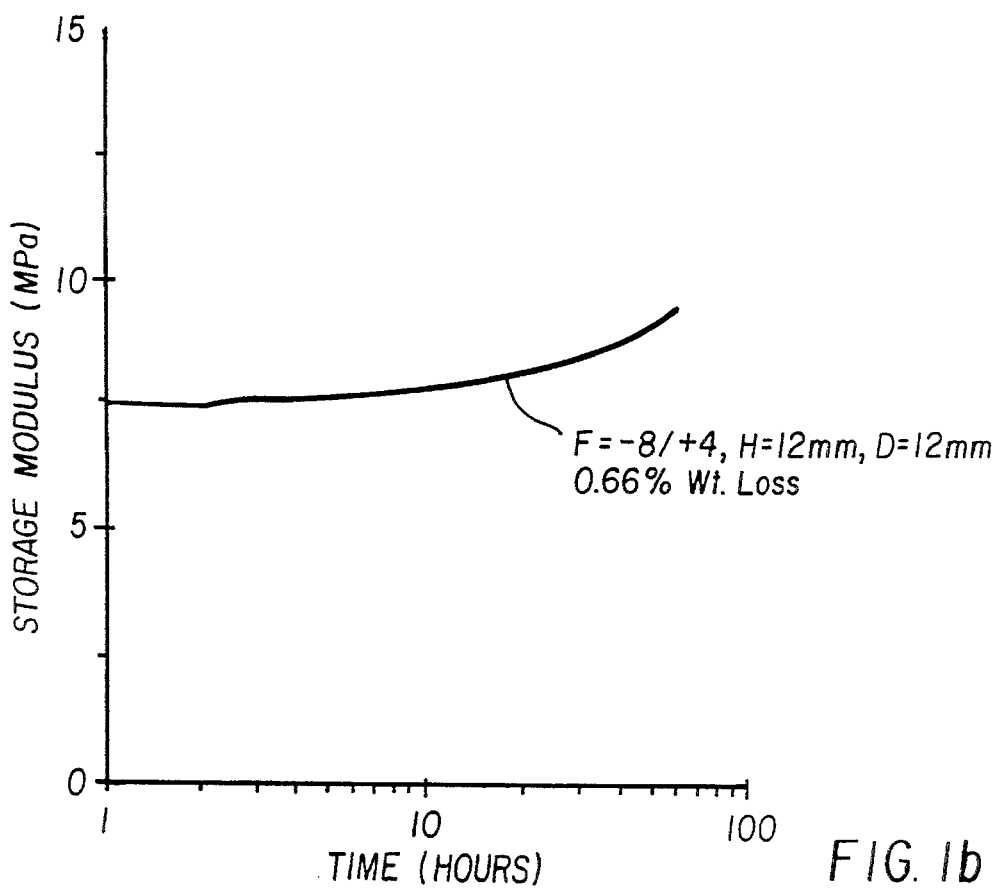
FIG. 1b is a graph of storage modulus vs. time for the material of Example 1.

The storage modulus determination was done in accordance with the method of calculation described in Fitzgerald, et al., "The Effect of Cyclic Stress on the Physical Properties of a Poly(dimethylsiloxane) Elastomer", Polymer Engineering and Science, Vol. 32, No. 18 (September 1992), pp. 1350–1357. Circular disks (12 mm diameter) were cut from the slab. Six of the circular disks were stacked, one upon the other, weighed, and then placed in a test instrument called a Mechanical Energy Resolver (also referred to herein as an "MER"), commercially available from Instrumentors, Inc. Strongsville, Ohio, U.S.A. The instrument heated the stack to 218° C. and imposed a static compressive force of 8 kg on the stack. The length of the stack under the initial compressive force was then measured, as was the initial hardness (expressed in terms of "Initial storage modulus"). The MER then imposed cyclic stress on the sample stack by sinusoidally varying the initial compressive force by 4 kg rms at a frequency of 30 Hz for 60 hours, while maintaining the 218° C. temperature. After 60 hours, the final hardness ("Final storage modulus") and length of the six-disk stack under the static 8 kg compressive force were measured, as was the final weight of the sample stack. Results of these tests are presented in FIG. 1 and Table 1.

A fuser member in accordance with the invention could be prepared as follows. The outer surface of a rigid cylindrical aluminum core would be scrubbed clean, rinsed with hot water, and dried. To this core would be applied a thin layer of primer (obtainable commercially from General Electric Co., U.S.A., under the trade designation S54044) using a brush and then drying in ambient air (room temperature) for one hour.

The base cushion layer formulation described above would then be injected into a mold surrounding the core to mold the base cushion layer to the core. The material would then be left in the mold at room temperature for 18 hours. The covered roll would then be removed from the mold, allowed to stand for 2 days, then heated slowly up to a temperature of 232° C. over 18 hours, and then maintained at 232° C. for another 18 hours to complete the crosslinking. The resultant base cushion layer would have a thickness of about 2.5 mm. An oil-barrier layer comprising poly(vinylidene fluoride-co-hexafluoropropylene) (obtainable commercially from DuPont, U.S.A., under the trademark, Viton A) could then be coated to a thickness of about 25 micrometers on the base cushion layer to yield the final fuser member.

Example 2

30 Vol % tin oxide/poly(13 mole % fluorosiloxane/87 mole %. dimethylsiloxane)

Figure 2A:
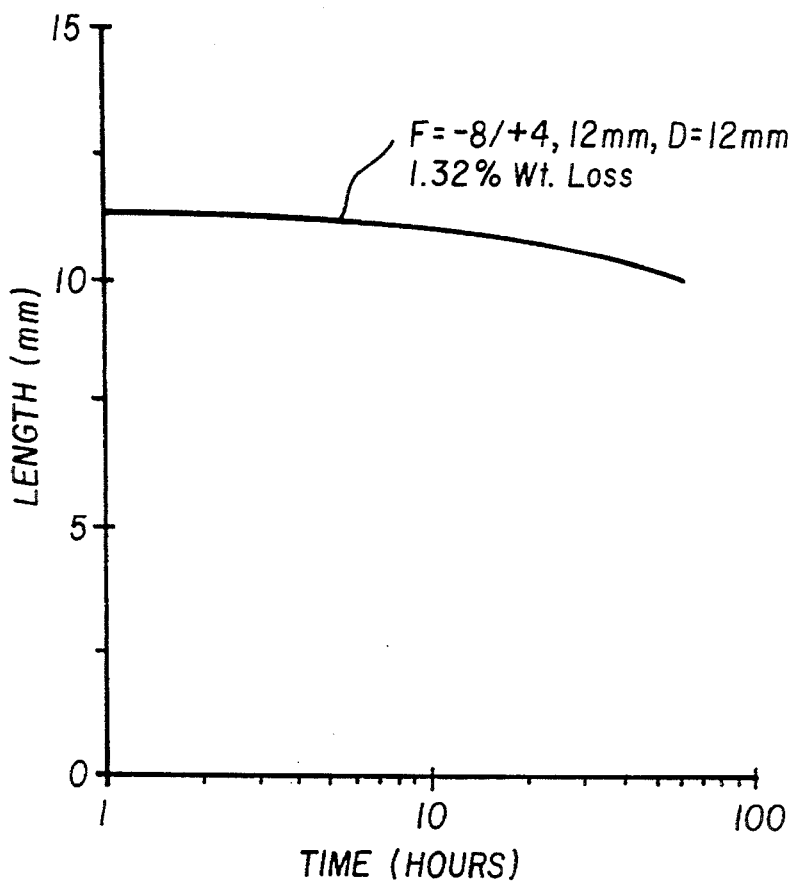
FIG. 2a is a graph of fractional length vs. time for the material of Example 2.
Figure 2B:
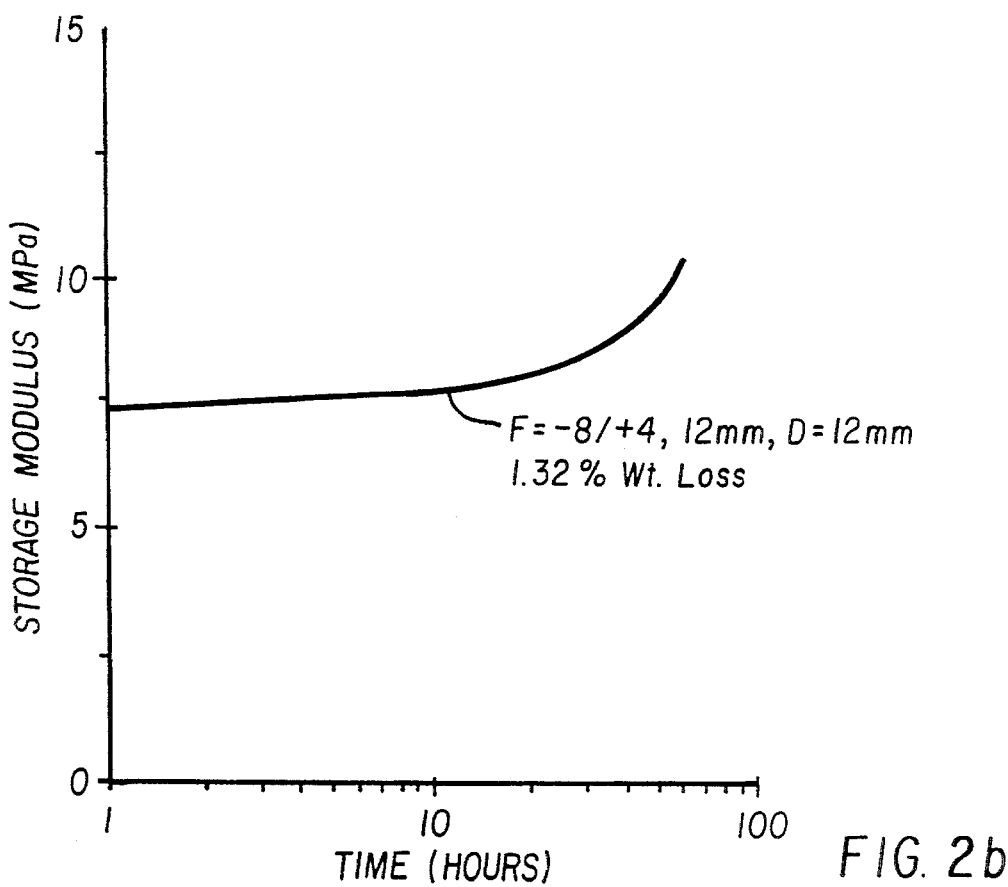
FIG. 2b is a graph of storage modulus vs. time for the material of Example 2.

This example was prepared in substantially the same manner as Example 1, with the following exceptions. The poly(DMS-FAS) was prepared using: silanol terminated poly(dimethylsiloxane) (401 grams, 0.229 mmol) having an average molecular weight of 1500 to 2000, marketed as PS340.5 by United Chemical; triethylamine (36.0 mL, 0.228 mol) and T2491 fluoroalkylsilane (81.8 grams, 0.177 mol). Elemental analysis of the Poly(DMS-FAS) product gave C=31.42, H=7.00, and F=7.72. This compares to theoretical values of C=32, H=7.0, and F=7.9. The poly(DMS-FAS) was cured and results are presented in FIG. 2 and Table 1.

Comparative Example A

30 Vol % aluminum oxide/6 mole % fluorosiloxane/94 mole % dimethylsiloxane

Figure 3A:
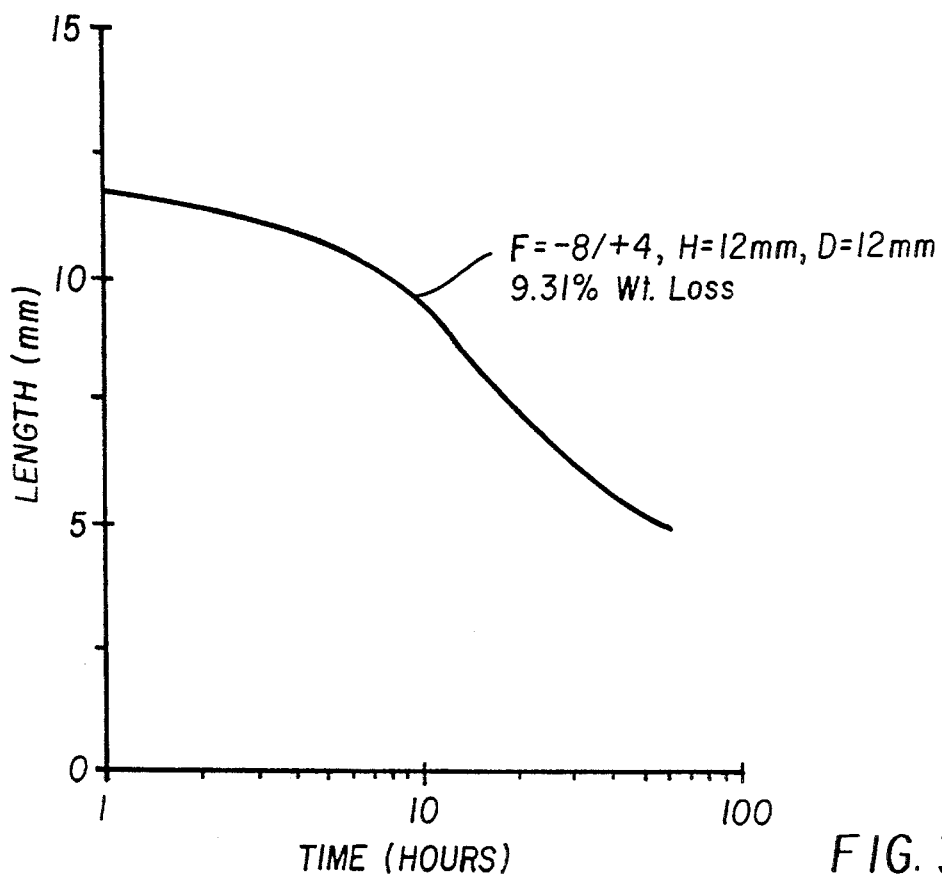
FIG. 3a is a graph of fractional length vs. time for the material of Comparative Example A.
Figure 3B:
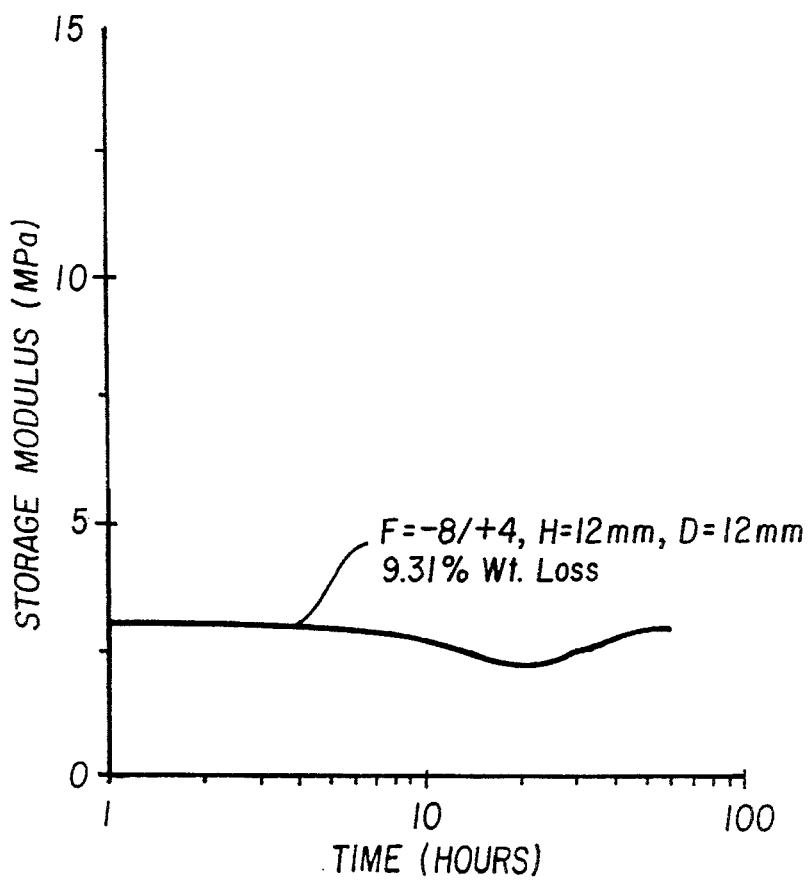
FIG. 3b is a graph of storage modulus vs. time for the material of Comparative Example A.

Sample circular disks were prepared and tested as described in Example 1, except that the samples contained 30 vol % particulate aluminum oxide filler, instead of the 30 vol. % tin oxide particulate filler employed in Example 1. Results are presented in FIG. 3 and Table 1.

The aluminum oxide filled material of Comparative Example A, exhibited much more weight loss and creep (change in length), but less change in storage modulus, than the tin oxide filled material of Example 1.

Comparative Example B

30 Vol % aluminum oxide/13 mole % fluorosiloxane/87 mole % dimethylsiloxane

Figure 4A:
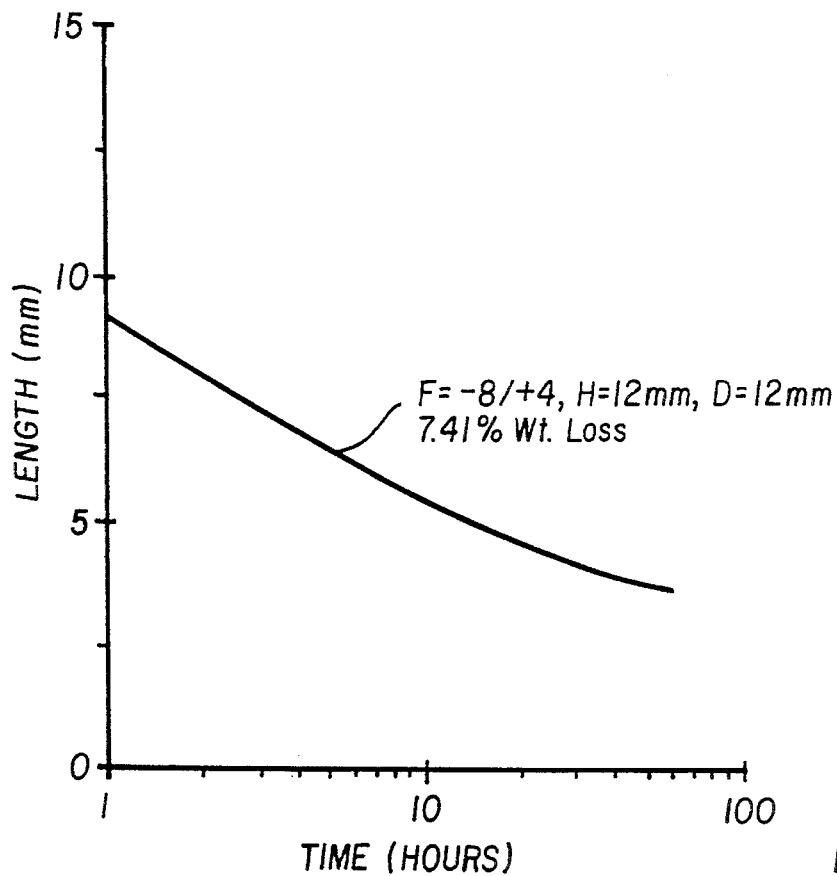
FIG. 4a is a graph of fractional length vs. time for the material of Comparative Example B.
Figure 4B:
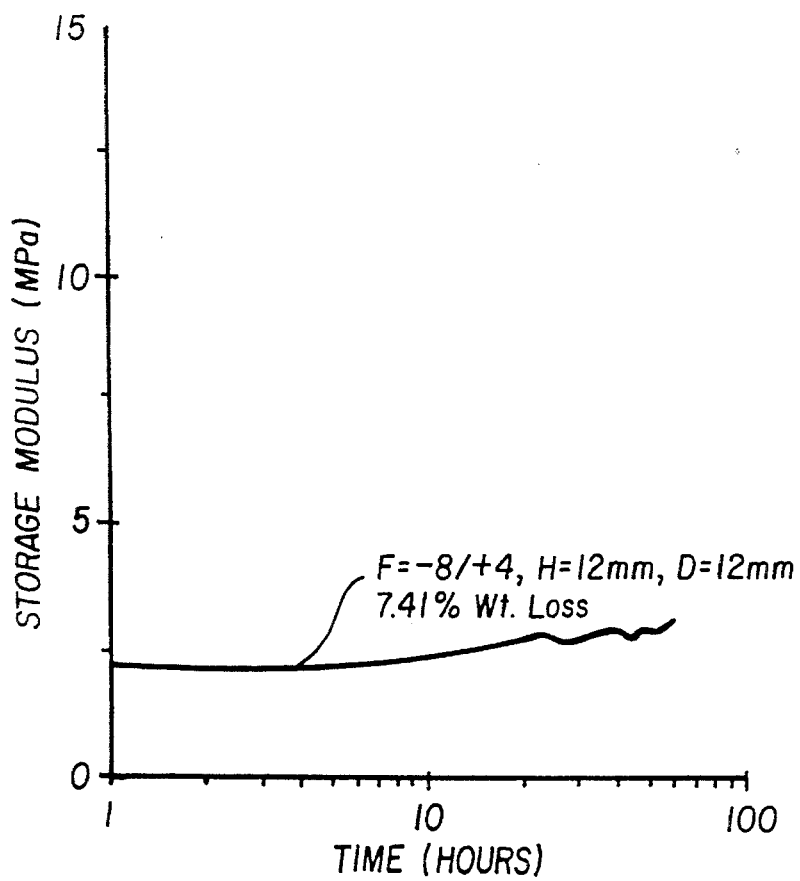
FIG. 4b is a graph of storage modulus vs. time for the material of Comparative Example B.

Sample circular disks were prepared and tested as in Comparative Example A, except that the polymer used was 13 mole % fluorosiloxane and 87 mole % dimethylsiloxane. Results are presented in FIG. 4 and Table 1. Results were comparable to those of Comparative Example A.

Comparative Example C

30 Vol % aluminum oxide; 100% polydimethylsiloxane

Sample slabs of filled condensation-crosslinked polydimethylsiloxane (PDMS) elastomer were prepared by mixing silanol-terminated PDMS having a weight average molecular weight of about 18,000 and was obtained commercially from Huls America of Piscataway, N.J., under the trade designation PS3425; 3.22 vol. % (1.02 wt %) TEOS crosslinking agent; 30.00 vol % (78.87 wt %) aluminum oxide particles; and 0.23 vol. % (0.11 wt %) dibutyltin diacetate catalyst on a three roll mill; and then stirring dibutyltin diacetate catalyst into the mix. The formulation was degassed and injected into a mold to cure for 48 hours at 25° C. and 50% relative humidity. The resultant slab was removed from the mold and further cured in an air-circulating oven for 16 hours at 205° C. Circular disks were cut and tested substantially as described in Example 1.

The aluminum oxide filled PDMS material of Comparative Example C was much more unstable under conditions of elevated temperature and cyclic stress than the tin oxide filled material of Example 1, exhibiting much more weight loss, change in storage modulus, and creep (change in length).

Example 3 and Comparative Example C

A slab of cured polymer was prepared substantially as described in Example 2 and Comparative Example B, respectively. Resistance to fusing oil induced swelling was determined by placing a sample of the elastomers in contact with 350 centistoke polydimethylsiloxane oil at a temperature of 175° C. for 7 days. The tin oxide filled elastomer of Example 3 a 1.6% increase in size. This compares to a 3.7% increase in size for the aluminum oxide filled elastomer of Comparative Example C.

TABLE 1

| Ex or Comp Ex | Initial storage modulus (MPa) | Final storage modulus (MPa) | Change in storage modulus (%) | Change in length (%) | Weight loss (%) |
| --- | --- | --- | --- | --- | --- |
| Ex 1 | 7.672 | 9.489 | 23.7 | 4.1 | 0.66 |
| Ex 2 | 7.485 | 10.367 | 38.5 | 12.3 | 1.32 |
| Comp Ex A | 3.333 | 2.971 | 10.9 | 59.7 | 9.31 |
| Comp Ex B | 2.568 | 3.055 | 19.0 | 65.0 | 7.41 |

The invention has been described in detail with particular reference to certain preferred embodiments thereof, but it should be appreciated that variations and modifications can be effected within the scope of the invention.

What is claimed is:

1. A fuser member useful for heat-fixing an electrographic toner to a substrate, said fuser member having a core and a base cushion layer covering said core, said base cushion layer comprising a crosslinked poly(dimethylsiloxane-fluoroalkylsiloxane) elastomer, said base cushion layer having tin oxide particles dispersed therein in a concentration of from 20 to 40 percent of the total volume of said base cushion layer.

2. The fuser member of claim 1, wherein said elastomer is less than about 20 mole percent fluoroalkylsiloxane.

3. The fuser member of claim 1, wherein said elastomer is from about 3 to about 15 mole percent fluoroalkylsiloxane.

4. The fuser member of claim 3, wherein the concentration of tin oxide particles is from 30 to 40 percent of the total volume of said base cushion layer.

5. The fuser member of claim 1, wherein the concentration of tin oxide particles is from 30 to 40 percent of the total volume of said base cushion layer.

6. The fuser member of claim 7, wherein said poly(dimethylsiloxane-fluoroalkylsiloxane) has been formed by condensation reaction of silanol-terminated poly(dimethylsiloxane) polymeric units with difunctional fluoroalkylsilanes.

7. The fuser member of claim 1, wherein said crosslinked poly(dimethylsiloxane-fluoroalkylsiloxane) elastomer has been formed by condensation reaction of poly(dimethylsiloxane-fluoroalkylsiloxane) and polyfunctional crosslinking agent.

8. The fuser member of claim 6, wherein the silanol-terminated poly(dimethylsiloxane-fluoroalkylsiloxane) polymeric units have a number average molecular weight of from $1\times10^3$ to $1\times10^6$.

9. The fuser member of claim 6, wherein said functional groups of said difunctional silanes are chloro.

10. The fuser member of claim 1, wherein said member has at least one additional layer over said base cushion layer.

11. The fuser member of claim 1, wherein said member has, over said base cushion layer, a first additional layer comprising vinyl-addition-crosslinked poly(dimethylsiloxane) containing silica and titania fillers, and an oil-barrier layer comprising poly(vinylidene fluoride-cohexafluoropropylene).

12. A fuser member useful for heat-fixing an electrographic toner to a substrate, said fuser member comprising a core and a base cushion layer covering said core, said base cushion layer including tin oxide particles dispersed therein in a concentration of from about 20 to about 40 percent of the total volume of said base cushion layer and a crosslinked polymer having chains of the general structure:

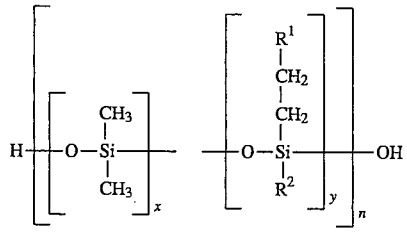

wherein $R^1$ is fluoroalkyl having from about 1 to 18 carbons and from about 3 to 37 fluorine atoms;

$R^2$ is alkyl having from 1 to 6 carbons;

x/y is from about 99:1 to 70:30; and n is an integer such that said chains have a number average molecular weight of from $1\times10^3$ to $1\times10^6$;

said base cushion layer being more resistant to cyclic stress induced degradation than a base cushion layer comprising aluminum oxide filled condensation-crosslinked polydimethylsiloxane.

13. The fuser member of claim 12 wherein $R^1$ has the general structure:

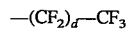

wherein d is from 3 to 5.

14. The fuser member of claim 13 wherein d is 5.

15. The fuser member of claim 12 wherein $R^2$ is methyl.

16. The fuser member of claim 12 wherein x/y is from about 98:2 to 80:20.

17. The fuser member of claim 12 wherein x/y is from 94:6 to 87:13.

18. The fuser member of claim 14 wherein said tin oxide particles are from 20 to 40 percent of the total volume of the base cushion layer, $R^2$ is methyl, and x/y is from about 98:2 to 80:20.

19. A fuser member useful for heat-fixing an electrographic toner to a substrate, said fuser member comprising a core and a base cushion layer covering said core, said base cushion layer comprising a condensation-crosslinked poly-(dimethylsiloxane-fluoroalkylsiloxane) elastomer, said base cushion layer having tin oxide particles dispersed therein in a concentration of from 20 to 40 percent of the total volume of the base cushion layer.

20. The fuser member of claim 7 wherein said polyfuctional crosslinking agent is polyfunctional silane.

* * * * *